United States Patent [19]
Yoshida et al.

[11] Patent Number: 6,115,202
[45] Date of Patent: Sep. 5, 2000

[54] DIGITAL SIGNAL RECORDING METHOD AND RECORDING APPARATUS FOR SEARCHING EACH RECORDED PROGRAM

[75] Inventors: Yumi Yoshida, Ebina; Seiji Higurashi, Tokyo, both of Japan

[73] Assignee: Victor Company of Japan, Ltd., Yokohama, Japan

[21] Appl. No.: 08/919,859

[22] Filed: Aug. 28, 1997

[30] Foreign Application Priority Data

Aug. 30, 1996 [JP] Japan ................................ 8-231039

[51] Int. Cl.⁷ ................................................. G11B 15/18
[52] U.S. Cl. ............................ 360/72.2; 369/32; 369/84
[58] Field of Search ........................... 369/58, 47, 48, 369/275.3, 32, 44.28, 84, 83; 360/72.1, 71

[56] References Cited

U.S. PATENT DOCUMENTS

| | | |
|---|---|---|
| 5,065,388 | 11/1991 | Roth et al. . |
| 5,124,963 | 6/1992 | Ando ........................................ 369/32 |
| 5,263,010 | 11/1993 | Amemiya et al. ...................... 369/47 |
| 5,367,510 | 11/1994 | Ando ........................................ 369/32 |
| 5,388,016 | 2/1995 | Kanai et al. . |
| 5,467,329 | 11/1995 | Hashimoto ............................. 369/54 |
| 5,487,047 | 1/1996 | Oka ......................................... 369/47 |
| 5,546,365 | 8/1996 | Roth . |
| 5,654,944 | 8/1997 | Lee et al. ................................. 369/60 |
| 5,790,484 | 7/1995 | Maeda et al. ........................... 369/54 |
| 5,825,726 | 9/1996 | Hwang et al. ....................... 369/275.3 |
| 5,825,739 | 6/1997 | Saito et al. .............................. 369/83 |

FOREIGN PATENT DOCUMENTS

| | | |
|---|---|---|
| 0545727 | 6/1993 | European Pat. Off. . |
| 0624876 | 11/1994 | European Pat. Off. . |
| 0646922 | 4/1995 | European Pat. Off. . |
| 4114384 | 4/1992 | Japan ....................................... 369/32 |

*Primary Examiner*—Nabil Hindi
*Attorney, Agent, or Firm*—Michael N. Meller; Eugene Lieberstein

[57] ABSTRACT

An encoder demodulates an input signal of a program. Main data of the program are recorded in a recording medium as main information in the form of data blocks. Auxiliary information of the program are recorded in the recording medium as packs having a fixed length shorter than a length of the data block. A memory temporarily stores designated auxiliary information of a concerned program in connection with identification information of the recording medium in response to a recording of the main data into the recording medium. A controller causes the encoder to read all of the auxiliary information of the program stored in the memory at a time. The readout auxiliary information have same identification information corresponding to the same recording medium. The readout auxiliary information are modulated as packs and recorded in the subcode areas of the recording medium having the corresponding identification information.

6 Claims, 9 Drawing Sheets

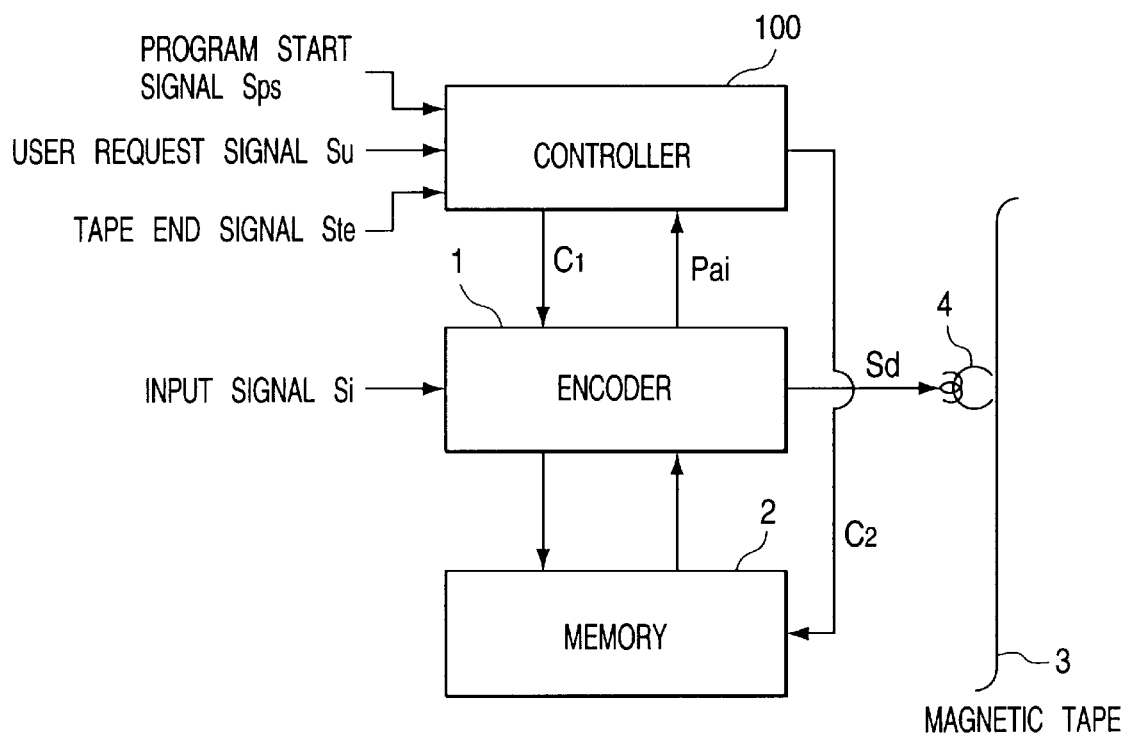

FIG. 2A
CASSETTE ID

| | MSB | | | | | | | LSB |
|---|---|---|---|---|---|---|---|---|
| PC0 | 0 | 0 | 0 | 0 | 0 | 0 | 0 | 1 |
| PC1 | CASSETTE NUMBER ||||||||
| PC2 | ||||||||
| PC3 | MAKER CODE ||||||||
| PC4 | RANDOM NUMBER ||||||||
| PC5 | ||||||||

FIG. 2B
ABSOLUTE TIME CODE

| | MSB | | | | | | | LSB |
|---|---|---|---|---|---|---|---|---|
| PC0 | 0 | 0 | 0 | 1 | 1 | 0 | 0 | 1 |
| PC1 | FRAME ||||||||
| PC2 | SECOND ||||||||
| PC3 | MINUTE ||||||||
| PC4 | HOUR ||||||||
| PC5 | DAY ||||||||

FIG. 2C
TOTAL TIME

| | MSB | | | | | | | LSB |
|---|---|---|---|---|---|---|---|---|
| PC0 | 0 | 0 | 0 | 1 | 0 | 0 | 0 | 1 |
| PC1 | FRAME ||||||||
| PC2 | SECOND ||||||||
| PC3 | MINUTE ||||||||
| PC4 | HOUR ||||||||
| PC5 | DAY ||||||||

FIG. 2D
RECORDING DATE

| | MSB | | | | | | | LSB |
|---|---|---|---|---|---|---|---|---|
| PC0 | 0 | 0 | 0 | 0 | 0 | 0 | 1 | 0 |
| PC1 | DAY ||||||||
| PC2 | WEEK |||| MONTH ||||
| PC3 | YEAR ||||||||
| PC4 | TIME ZONE ||||||||
| PC5 | RESERVATION ||||||||

FIG. 2E
RECORDING TIME

| | MSB | | | | | | | LSB |
|---|---|---|---|---|---|---|---|---|
| PC0 | 0 | 0 | 0 | 1 | 0 | 0 | 0 | 0 |
| PC1 | 0 | 0 | 0 | 0 | 0 | 0 | 0 | 0 |
| PC2 | SECOND ||||||||
| PC3 | MINUTE ||||||||
| PC4 | HOUR ||||||||
| PC5 | 0 | 0 | 0 | 0 | 0 | 0 | 0 | 0 |

FIG. 2F
SOURCE

| | MSB | | | | | | | LSB |
|---|---|---|---|---|---|---|---|---|
| PC0 | 0 | 0 | 0 | 0 | 0 | 0 | 1 | 1 |
| PC1 | CHANNEL ||||||||
| PC2 | ||||||||
| PC3 | ADDITIONAL PACK NUMBER ||||||||
| PC4 | RESERVATION ||||||||
| PC5 | ||||||||

FIG. 2G
TEXT HEADER (TITLE)

| | MSB | | | | | | | LSB |
|---|---|---|---|---|---|---|---|---|
| PC0 | 0 | 0 | 1 | 0 | 0 | 0 | 0 | 0 |
| PC1 | TOTAL NUMBER OF TEXT DATA ||||||||
| PC2 | TEXT CODE ||||||||
| PC3 | PROGRAM NUMBER ||||||||
| PC4 | INDEX NUMBER ||||||||
| PC5 | RESERVATION ||||||||

FIG. 2H
TEXT DATA (TITLE)

| | MSB | | | | | | | LSB |
|---|---|---|---|---|---|---|---|---|
| PC0 | 0 | 0 | 1 | 0 | 1 | 0 | 0 | 0 |
| PC1 | PACK PAGE NUMBER ||||||||
| PC2 | DATA ||||||||
| PC3 | DATA ||||||||
| PC4 | DATA ||||||||
| PC5 | DATA ||||||||

FIG. 2I
PROGRAM INFORMATION

| | MSB | | | | | | | LSB |
|---|---|---|---|---|---|---|---|---|
| PC0 | 0 | 0 | 1 | 1 | 0 | 0 | 1 | 0 |
| PC1 | PROGRAM NUMBER ||||||||
| PC2 | INDEX NUMBER ||||||||
| PC3 | TOTAL NUMBER OF PROGRAM ||||||||
| PC4 | TOTAL NUMBER OF INDEX ||||||||
| PC5 | RESERVATION ||||||||

FIG. 2J
TOC OF RECORDING START TIME

| | MSB | | | | | | | LSB |
|---|---|---|---|---|---|---|---|---|
| PC0 | 0 | 0 | 1 | 1 | 0 | 0 | 0 | 0 |
| PC1 | PROGRAM NUMBER ||||||||
| PC2 | INDEX NUMBER ||||||||
| PC3 | ABSOLUTE TRACK NUMBER ||||||||
| PC4 | ||||||||
| PC5 | ||||||||

FIG. 2K
TOC OF PROGRAM INFORMATION

| | MSB | | | | | | | LSB |
|---|---|---|---|---|---|---|---|---|
| PC0 | 0 | 0 | 1 | 1 | 0 | 0 | 0 | 1 |
| PC1 | TOTAL NUMBER OF PROGRAM ||||||||
| PC2 | PROGRAM A ||||||||
| PC3 | TOTAL NUMBER OF A'S INDEX ||||||||
| PC4 | PROGRAM B ||||||||
| PC5 | TOTAL NUMBER OF B'S INDEX ||||||||

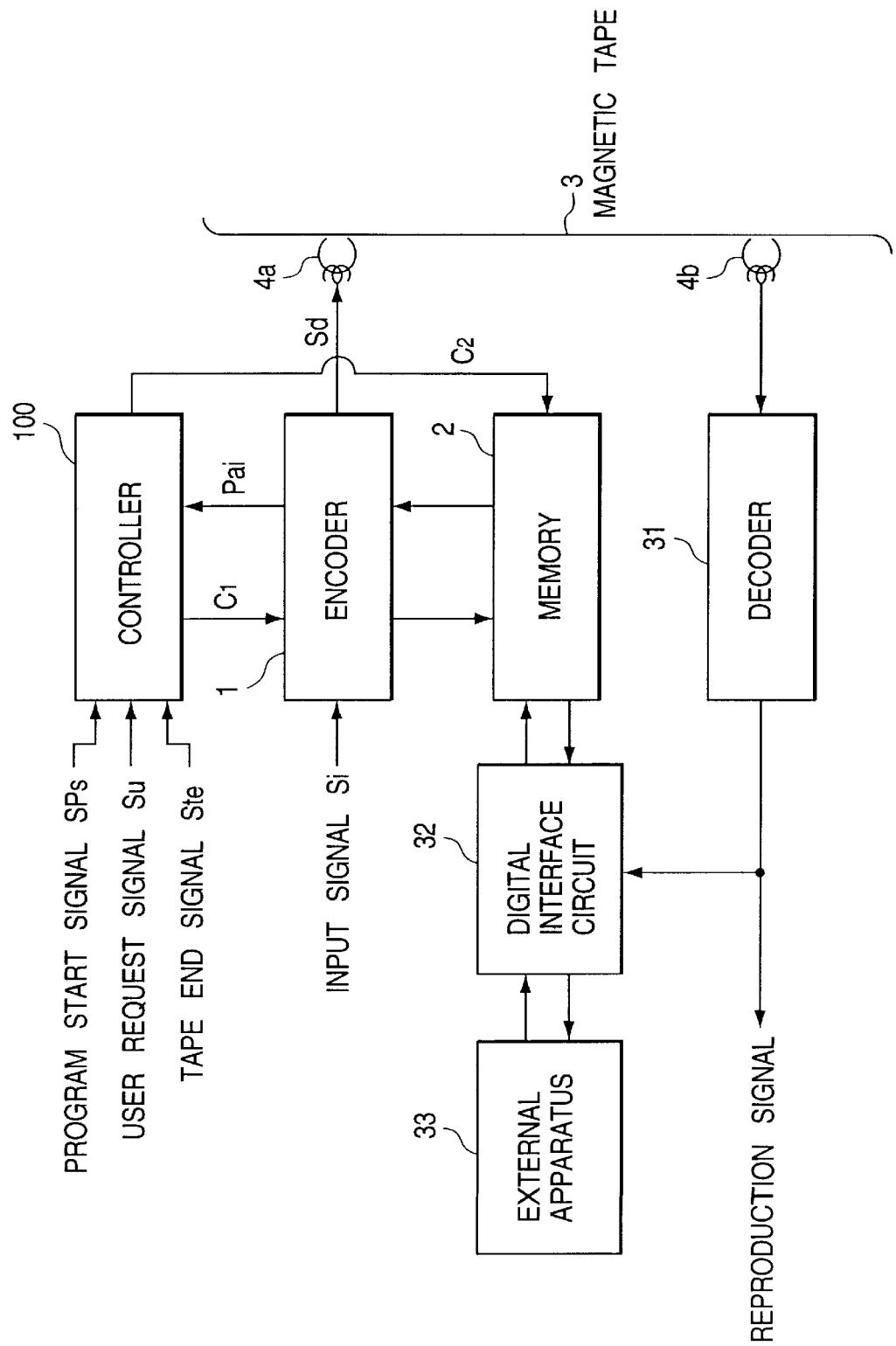

DIGITAL SIGNAL RECORDING METHOD AND RECORDING APPARATUS FOR SEARCHING EACH RECORDED PROGRAM

BACKGROUND OF THE INVENTION

1. Field of the Invention

The present invention relates to a digital signal recording method and a related recording apparatus. More specifically, the present invention relates to a method and an apparatus for recording digital signals according to which main data of a program are recorded as main information into a recording medium together with related auxiliary information of the program.

2. Prior Art

Digital signals are recorded in a recording medium such as a magnetic tape. When a digital signal is recorded in such a recording medium, the digital signal is modulated sequentially into data blocks and recorded on each track of the recording medium. The digital signal to be recorded or reproduced comprises main data of a program serving as main information. Besides the main data, the digital signal comprises auxiliary information relating to the recording of a concerned program. For example, the auxiliary information include time code data indicating a recorded portion or a time-represented position of a program in a recording medium, as well as cassette identification data, recorded date and time, title information, and source information. In general, the auxiliary information are recorded in a predetermined region (e.g. a subcode region) of the track which is separated from the recording region of the main data. The recorded auxiliary information can be reproduced independent of the main data.

The recorded auxiliary information are displayed and utilized for a search of an intended program. The search of each recorded program is facilitated. This system is a so-called tape navigation system.

SUMMARY OF THE INVENTION

An objection of the present invention is to provide a digital signal recording method according to which many auxiliary information can be effectively recorded using a small-scale memory. Furthermore, the present invention has an object to provide a recording apparatus using the above-described recording method.

Another object of the present invention is provide a digital signal recording method and a related apparatus according to which the auxiliary information are compatibly reproducible by any other VTR.

To accomplish those and other related objects, a first aspect of the present invention provides a digital signal recording method for recording main data of a program as main information into a recording medium in the form of data blocks, and for recording auxiliary information of the program into the recording medium as packs having a fixed length shorter than a length of the data block. The digital signal recording method comprises the steps of: recording the main data of the program into the recording medium; temporarily memorizing designated auxiliary information of the program into a memory means in response to the recording of the main data of the program, the designated auxiliary information of the program being stored in the memory means in association with identification information of the recording medium; repeating the recording of the main data of the program into the recording medium and the memorization of designated auxiliary information of the program into the memory means; simultaneously reading all of the auxiliary information relating to the same recording medium from the memory means; and recording the readout auxiliary information in the form of the packs into a specific region of the recording medium having the identification information.

According to another aspect of the present invention, the digital signal recording method further comprising the steps of: allowing an external apparatus to read and edit the auxiliary information having the same identification information of the recording medium from the memory means; memorizing the edited auxiliary information into the memory means; simultaneously reading all of the edited auxiliary information from the memory means; and recording the readout edited auxiliary information in the form of the packs into a specific region of the recording medium having the identification information.

Preferably, the auxiliary information in the form of the packs recorded in the recording medium comprises first auxiliary information recorded in a recording region of a concerned program, second auxiliary information recorded in a recording region of a preceding program, and third auxiliary information recorded in a recording region preceding a first recorded program. The first auxiliary information includes recording start positions of the concerned program and any preceding recorded programs. The second auxiliary information includes a recording start point of the concerned program. The third auxiliary information includes all of recording start positions of all recorded programs of the recording medium.

Furthermore, the present invention provides a recording apparatus comprising: signal generating means for receiving an input signal and producing main data of a program as main information in the form of data blocks and related auxiliary information of the program in the form of packs having a fixed length shorter than a length of the data block, the recording apparatus comprising: recording means for receiving the main data and the related auxiliary information from the signal generating means and recording the main data and the related auxiliary information into a recording medium; memory means for temporarily memorizing designated auxiliary information of the program in response to the recording of the main data of the program, and the designated auxiliary information of the program being stored in the memory means in association with identification information of the recording medium. Or, the auxiliary information are reproduced from a playback means. An external apparatus receives the auxiliary information reproduced from the playback means and edits the auxiliary information in a desired manner. The edited auxiliary information are memorized in the memory means.

As described above, according to the method and apparatus of the present invention, the main data of each program are recorded in a recording medium. The designated auxiliary information relating to the program are temporarily memorized in a memory means in response to the recording of the main data. After the recording of all programs into the recording medium is finished, or at an arbitrary time, all of the memorized auxiliary information are read out simultaneously from the memory means and recorded on the recording medium. Accordingly, memorization of the auxiliary information in the memory means is temporary. And, there is no necessity of recording the auxiliary information of the program every time the main data of each program are recorded into the recording medium.

BRIEF DESCRIPTION OF THE DRAWINGS

The above and other objects, features and advantages of the present invention will become more apparent from the following detailed description which is to be read in conjunction with the accompanied drawings, in which:

FIG. 1 is a block diagram showing an essential arrangement of a recording apparatus in accordance with a first embodiment of the present invention;

FIGS. 2A through 2K are views showing various examples of the format of a pack recorded in accordance with the present invention;

FIG. 8 is a block diagram showing an essential arrangement of a recording apparatus in accordance with a second embodiment of the present invention;

DESCRIPTION OF THE PREFERRED EMBODIMENTS

Figure 3:
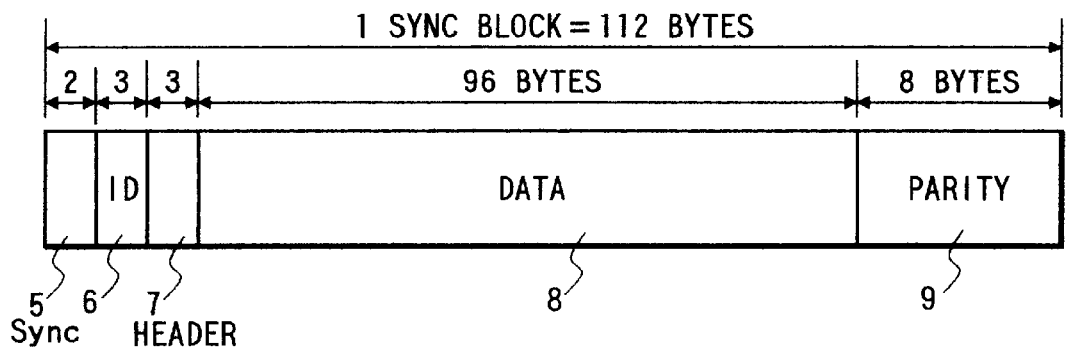
FIG. 3 is a view showing an example of the format of a sync block in accordance with the present invention.

Preferred embodiments of the present invention will be explained with reference to the accompanied drawings. Identical parts are denoted by the same reference numerals throughout the views.

First Embodiment

FIG. 1 is a block diagram showing an essential part of a recording apparatus in accordance with a first embodiment of the present invention. The recording apparatus of this embodiment comprises an encoder 1, a memory 2, a magnetic tape 3, a recording rotary head assembly 4 and a controller 100. The encoder 1 receives an input signal Si, such as a video signal and an audio signal, of a TV program and encodes the input signal Si. A digital signal Sd is produced from the encoder 1. The memory 2 receives various information related to the recording operation from the encoder 1 and stores these data. The memory 2 sends the stored data to the encoder 1. The recording rotary head assembly 4 forms tracks successively on a magnetic tape 3 for recording the digital signal Sd on the magnetic tape 3. The recording apparatus of the first embodiment is a digital recorder which is of a type of a helical scanning VTR. The recording rotary head assembly 4 records the digital signals on each track of the magnetic tape 3 and reproduces the digital signals from the magnetic tape 3. The recording apparatus of the first embodiment is characterized by the method of recording packs.

Although not shown in FIG. 1, the recording rotary head assembly 4 comprises two rotary heads opposed diametrically with respect to a rotary drum and mounted on a cylindrical surface of this rotary drum. The rotary drum is rotated by a motor (not shown) at a predetermined constant speed equal to, for example, 30 rps or 29.97 rps. These two rotary heads have azimuth angles different from each other. When seen in a rotational direction, a playback rotary head is located at a position preceding these recording rotary heads. The magnetic tape 3 is wound obliquely on the cylindrical surface of the rotary drum in an angular range slightly greater than 180 degrees. The magnetic tape 3 travels at a constant speed by a conventionally-known drive mechanism (not shown).

The controller 100, such as a microcomputer, receives a program start signal Sps, a user request signal Su, a tape end signal Ste, and other signals (although not shown). The program start signal Sps is produced in response to a start of a recoding operation. The program end signal Spe is produced in response to a termination of the recording operation. The user request signal Su is produced in response to a user's request. The tape end signal Ste is produced when the magnetic tape 3 is fully recorded. The controller 100 sends a control command C1 to the encoder 1 and a control command C2 to the memory 2 based on the input signals Sps, Su and Ste. Furthermore, the controller 100 receives pack information Pai from the encoder 1 to check the type of the pack information Pai.

The recorded digital signal Sd comprises main data of a recorded program as main information. The recorded digital signal Sd further comprises auxiliary information relating to the recording of the recorded program. The auxiliary information are united as fixed-length data which are collectively referred to as a pack. Each pack can include various auxiliary information relating to the recorded program, such as cassette ID information, time code data, recording date and time, source information (e.g., channel or program index number referred to when a digital broadcasting signal is recorded), and text data (e.g., title and abstract of each program).

FIGS. 2A trough 2K show various arrangements of the above-described pack. The pack of the first embodiment basically comprises the fixed-length data of 6 bytes. A first byte "PC0" of each pack is assigned to a specific pattern used to identify the kind of each pack.

FIG. 2A shows a format of a pack applied to the cassette ID information. A second byte "PC1" and a third byte "PC2" are assigned to cassette numbers given to respective cassettes accommodating magnetic tapes. A total of six upper-digit bits of a fourth byte "PC3" are assigned to a manufacturer's code. The remaining two lower-digit bits of the fourth byte "PC3" and all bits of fifth and sixth bytes "PC4" and "PC3" are assigned to a random number.

FIG. 2B shows a format of a pack applied to the absolute time code data. Its second byte "PC1" is assigned to a frame value of the signal of a recorded program. The third byte "PC2" is assigned to a "second" value. The fourth byte "PC3" is assigned to a "minute" value. The fifth byte "PC4" is assigned to a "hour" value. The sixth byte "PC5" is assigned to a "day" value. The absolute time code represents absolute time information on the recorded magnetic tape, starting from the beginning of the tape.

FIG. 2C shows a format of a pack applied to a total time. Its second byte "PC1" is assigned to a total frame value of the recorded program. The third byte "PC2" is assigned to a "second" value. The fourth byte "PC3" is assigned to a "minute" value. The fifth byte "PC4" is assigned to a "hour" value. The sixth byte "PC5" is assigned to a "day" value. The total time pack represents a total time of the recorded program.

FIG. 2D shows a format of a pack applied to a recorded date. Its second byte "PC1" is assigned to a "day" value of the recorded date. The third byte "PC2" is assigned to "week" and "month" values. The fourth byte "PC3" is assigned to a "year" value. The fifth byte "PC4" is assigned to a "time zone" value. The sixth byte "PC5" is used as a "reservation" region.

FIG. 2E shows a format of a pack applied to a recording start time. Its third byte "PC2" is assigned to a "second" value, the fourth byte "PC3" is assigned to a "minute" value, and the fifth byte "PC4" is assigned to a "hour" value of the recording start time. Its second byte "PC1" and sixth byte "PC5" are valued "0", respectively.

FIG. 2F shows a format of a pack applied to the source. Its second byte "PC1" and third byte "PC2" are assigned to a "television broadcasting channel" value according to the BCD arrangement. Thus, the "television broadcasting channel" value is discriminable up to the units of hundred. The fourth byte "PC3" is assigned to a total number of additional packs. Both of the fifth byte "PC4" and the sixth byte "PC5" are used as a "reservation" region. The total number of the additional pack represents the number of additional packs succeeding the source pack.

FIG. 2G shows a format of a pack applied to a text header. Its second byte "PC1" is assigned to a total number indicating the total number of text data succeeding this header. The third byte "PC2" is assigned to a text code. The fourth byte "PC3" is assigned to a program number. The fifth byte "PC4" is assigned to an index number. The sixth byte "PC5" is used as a "reservation" region.

FIG. 2H shows a format of a pack applied to text data. Its second byte "PC1" is assigned to a pack page number that indicates the order of the text data pack numbered from the text header. The third byte "PC2" through the sixth byte "PC5" are assigned to the text data.

FIG. 2I shows a format of a pack applied to program information. Its second byte "PC1" is assigned to the program number. The third byte "PC2" is assigned to an. index number. The fourth byte "PC3" is assigned to the total number of programs. The fifth byte "PC4" is assigned to the total number of indices. The sixth byte "PC5" is used as a "reservation" region.

FIG. 2J shows a format of a pack applied to TOC (i.e., table of contents) information representing the recording start point of the recorded program. Its second byte "PC1" is assigned to the program number. The third byte "PC2" is assigned to the index number. The fourth byte "PC3" through the sixth byte "PC5" are assigned to an absolute track number representing the recording start position of the recorded program. The absolute track number is a track number numbered from the start position of the first recorded program (i.e., the head of the tape). The absolute track number is recorded in a subcode region later described.

FIG. 2K shows a format of a pack applied to TOC information representing the program information. Its second byte "PC1" is assigned to the total number of all recorded programs. The third byte "PC2" is assigned to a program A. The fourth byte "PC3" is assigned to the total number of the indices of the program A. The fifth byte "PC4" is assigned to a program B. The sixth byte "PC5" is assigned to the total number of the indices of the program B.

The above-described packs are recorded on the tracks of the magnetic tape together with the main data and subcode data. Each track comprises a plurality of sync blocks corresponding to the previously described data blocks. Each sync block is a constant-volume data area which is formed in accordance with a scanning of the rotary head.

FIG. 3 shows an example of a format for a sync block. One sync block is equivalent to 112 bytes in capacity and is separated into sequential sections. More specifically, this sync block comprises a sync signal area 5 of two bytes, an address information area (ID) 6 of three bytes, a header storage area 7 of three bytes, a data storage area 8 of 96 bytes, a parity area 9 of eight bytes. The sync signal area 5 is necessary when this sync block is reproduced. The address information area 6 stores identification information. The header storage area 7 stores various information. The data storage area 8 serves as a substantial region for storing data of the input signal. The parity area 9 stores parities for correcting an error or errors in the information contained in this sync block.

Figure 4:
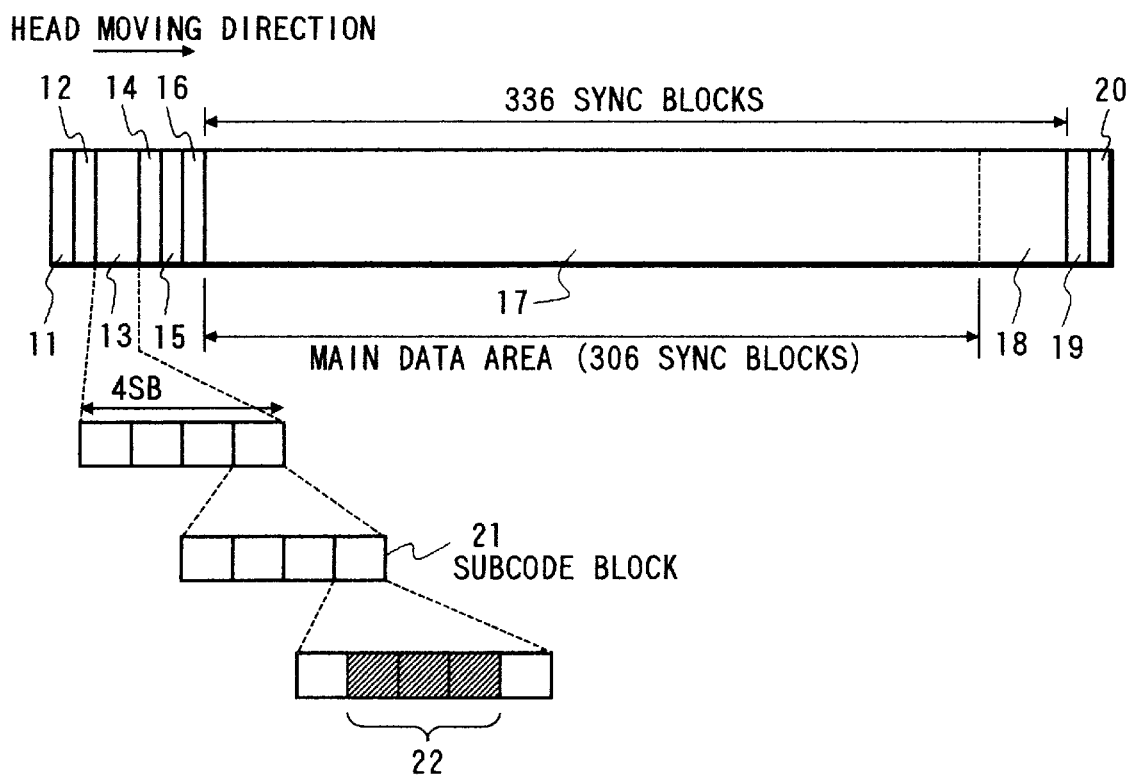
FIG. 4 is a view showing an example of the format of a track recorded on a recording medium in accordance with the present invention.

FIG. 4 shows the structure of one track of the magnetic tape in accordance with a preferred embodiment of the present invention. One track is equivalent to 356 sync blocks in capacity and has a sequence of a margin area 11, a preamble area 12, a subcode area 13, a postamble area 14, an IBG area 15, a preamble area 16, a main data area 17, an error-correcting code area 18, a postamble area 19, and a margin area 20.

For example, the main data area 17 consists of 306 sync blocks which is a multiple of 6 sync blocks. The error-correcting code area 18, consisting of 30 sync blocks, records an outer error-correcting code (i.e., C3 code) required for the error correction.

The subcode area 13 consists of four sync blocks (=448 bytes). Each sync block of the subcode area 13 consists of four subcode blocks 21. Each subcode block 21, consisting of 28 bytes, comprises three packs 22. Accordingly, a total of 48 (=4×4×3) packs are recorded in the subcode area 13.

In each of 306 sync blocks constituting the main data area 17, one byte of the header storage area 7 is allocated to one byte of a pack. In other words, six bytes of one pack are collected from six sync blocks. A total of 51 (=306/6) packs are recorded in the main data area 17. Thus, the entire region of one track contains 99 (=48+51) packs.

Next, the time code data recorded in accordance with the above-described first embodiment of the present invention will be explained. As explained above, FIG. 2B shows the format of the absolute time code data. The format shown in FIG. 2B is applied to program time code data indicating the recording time of each program or to index time code data indicating the recording time of each index (although the pack header value of the first byte "PC0" may be differentiated).

Figure 5:
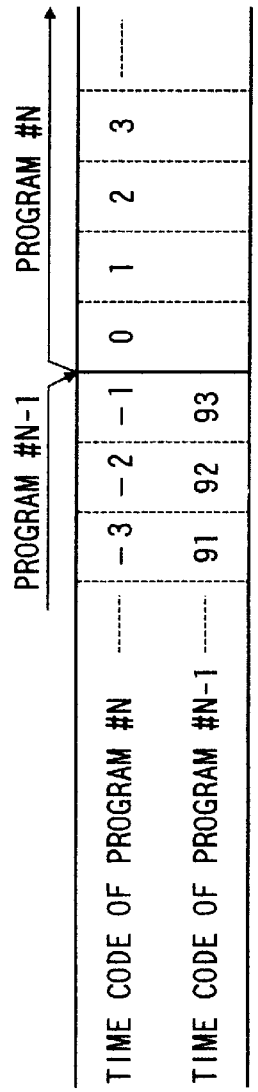
FIG. 5 is a view illustrating a variation in the program time code value recorded in accordance with the present invention.

FIG. 5 shows program time code values in the vicinity of the recording start position of a program "n" recorded in the n place on the magnetic tape numbered from the head of the magnetic tape. A program "n−1", recorded immediately before the program "n", has a program time code of 93 at its recording end position. The program time code of the program "n" takes minus values in the plus range of the program "n−1".

Each of the program time code and the index time code is initialized at the recording start position, and is incremented as plus value with elapsing time. Hereinafter, this region is referred to as a plus region where the program/index time code is recorded as a plus value. As shown in FIG. 5, the program/index time code is recorded as minus value in a region preceding the recording start position. Hereinafter, this region is referred to as a minus region where the program/index time code is recorded as a minus value. Basically, the absolute time code is initialized at a predetermined start point set at the head of a magnetic tape.

However, the absolute time code is recorded as a minus value at the region preceding this predetermined start point.

Figure 6:
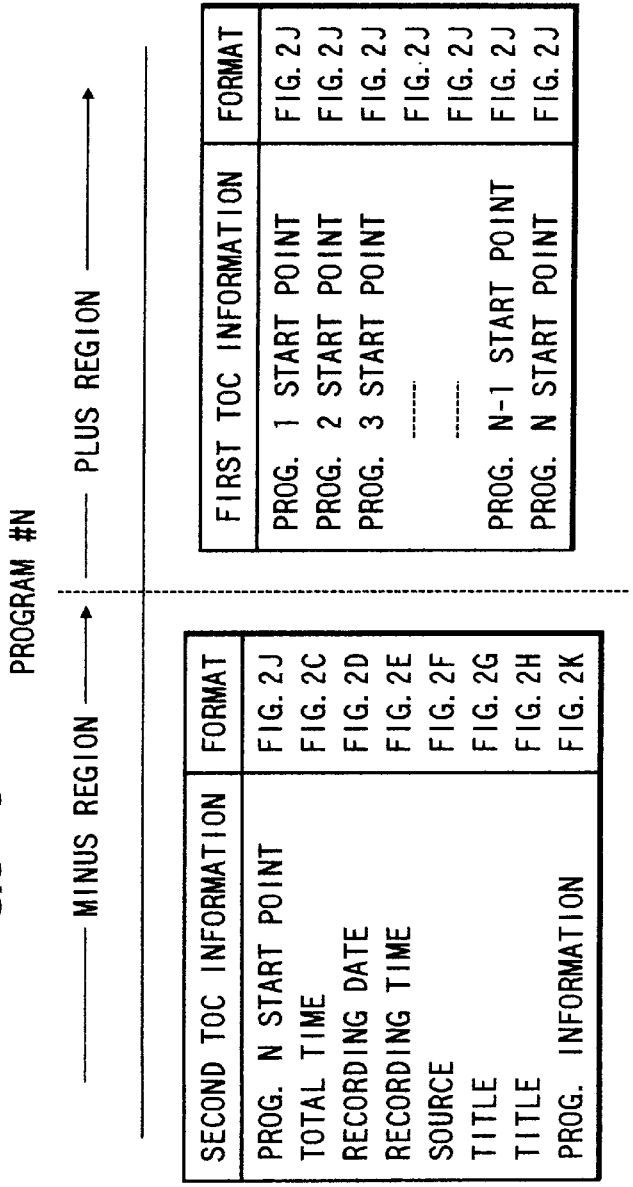
FIG. 6 is a view showing auxiliary information packs recording in accordance with the present invention.

As explained above, the preferred embodiment of the present invention records the TOC information. Details of the TOC information will be explained. There are three kinds of TOC information. A first TOC information is a TOC assembly of preceding programs recorded on the same magnetic tape. The first TOC information is recorded in the plus region of the program time code of each concerned program, as shown in FIG. 6. More specifically, the first TOC information comprises TOC packs, discriminable in the format shown in FIG. 2J, representing recording start points of all already recorded programs "1" to "n−1" and the concerned program "n".

A second TOC information is a TOC assembly of each concerned program. The second TOC information is recorded in the minus region of the program time code of each concerned program. More specifically, the second TOC information comprises a TOC pack, discriminable in the format shown in FIG. 2J, representing the recording start point of the concerned program. Furthermore, the second TOC information comprises TOC packs, discriminable in the format shown in FIGS. 2C to 2H and 2K, representing other auxiliary information of the concerned program, as shown in FIG. 6.

A third TOC information is a TOC assembly of all program recorded in the same cassette. The third TOC information is recorded in the head region of the magnetic tape, which corresponds to the minus region of the absolute time code shown in the format of FIG. 2B. More specifically, the third TOC information comprises TOC packs, discriminable in the format shown in FIG. 2J, representing the recording start points of all recorded programs contained in the magnetic tape. Furthermore, the third TOC information comprises TOC packs, discriminable in the format shown in FIGS. 2C to 2H and 2K, representing other auxiliary information of the all recorded programs. In other words, the third TOC information is an integration or accumulation of the first TOC information and the second TOC information shown in FIG. 6 for the all recorded programs.

Figure 9A:
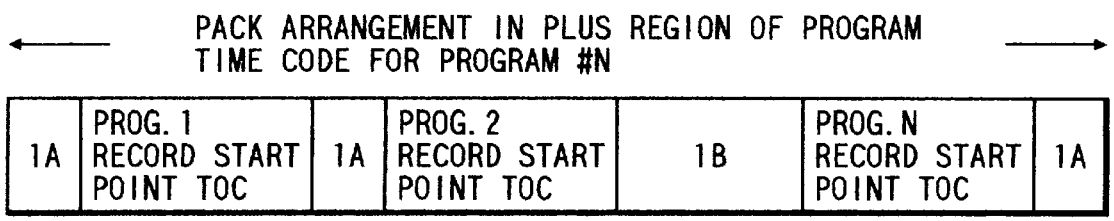
FIGS. 9A through 9C are views illustrating a pack arrangement in accordance with the present invention.

FIG. 9A shows a pack arrangement of the first TOC information. In the plus region of the program time code for the program "n", the record start time TOC packs of respective programs 1 through "n" are sequentially arranged. In FIG. 9A, regions 1A and 1B comprise an arbitrary number of packs. The region 1B comprises TOC packs relating to the recording start points of the program 3 through the program "n−1".

Figure 9B:
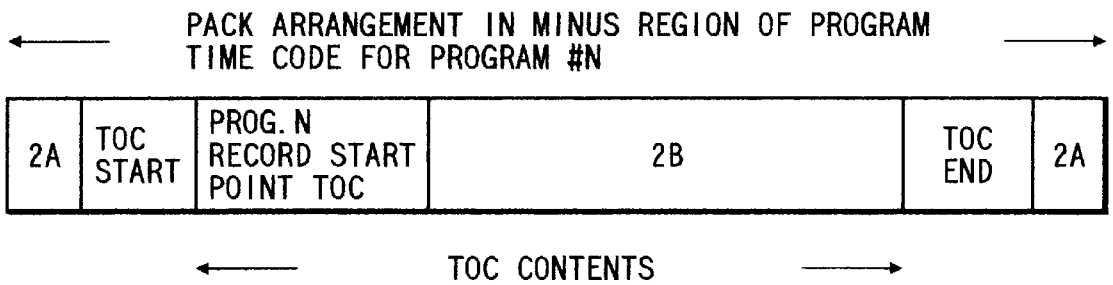

FIG. 9B shows a pack arrangement of the second TOC information. In the minus region of the program time code for the program "n", an intermediate section between a TOC start pack and a TOC end pack is a TOC content region where the above-described various packs of the second TOC information are allocated. In FIG. 9B, regions 2A and 2B comprise an arbitrary number of packs.

Figure 9C:
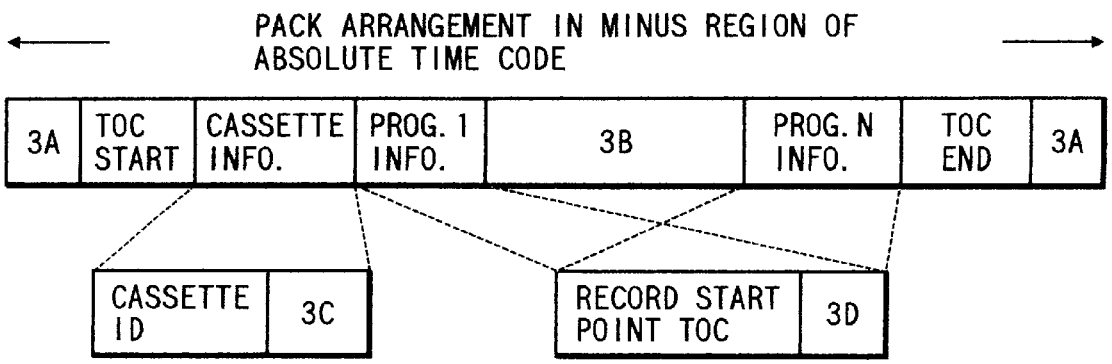

FIG. 9C shows a pack arrangement of the third TOC information. In a minus region of the absolute time code, a region sectioned by a TOC start pack and a TOC end pack is a TOC content region where the all packs of the third TOC information are allocated. More specifically, the cassette information and the program information covering all of the recorded programs are sequentially recorded in this TOC content region. In FIG. 9C, regions 3A, 3B, 3C and 3D comprise an arbitrary number of packs. The region 3C includes an information pack relating to the cassette, such as a text header, a text data representing a title of the cassette.

Figure 7:
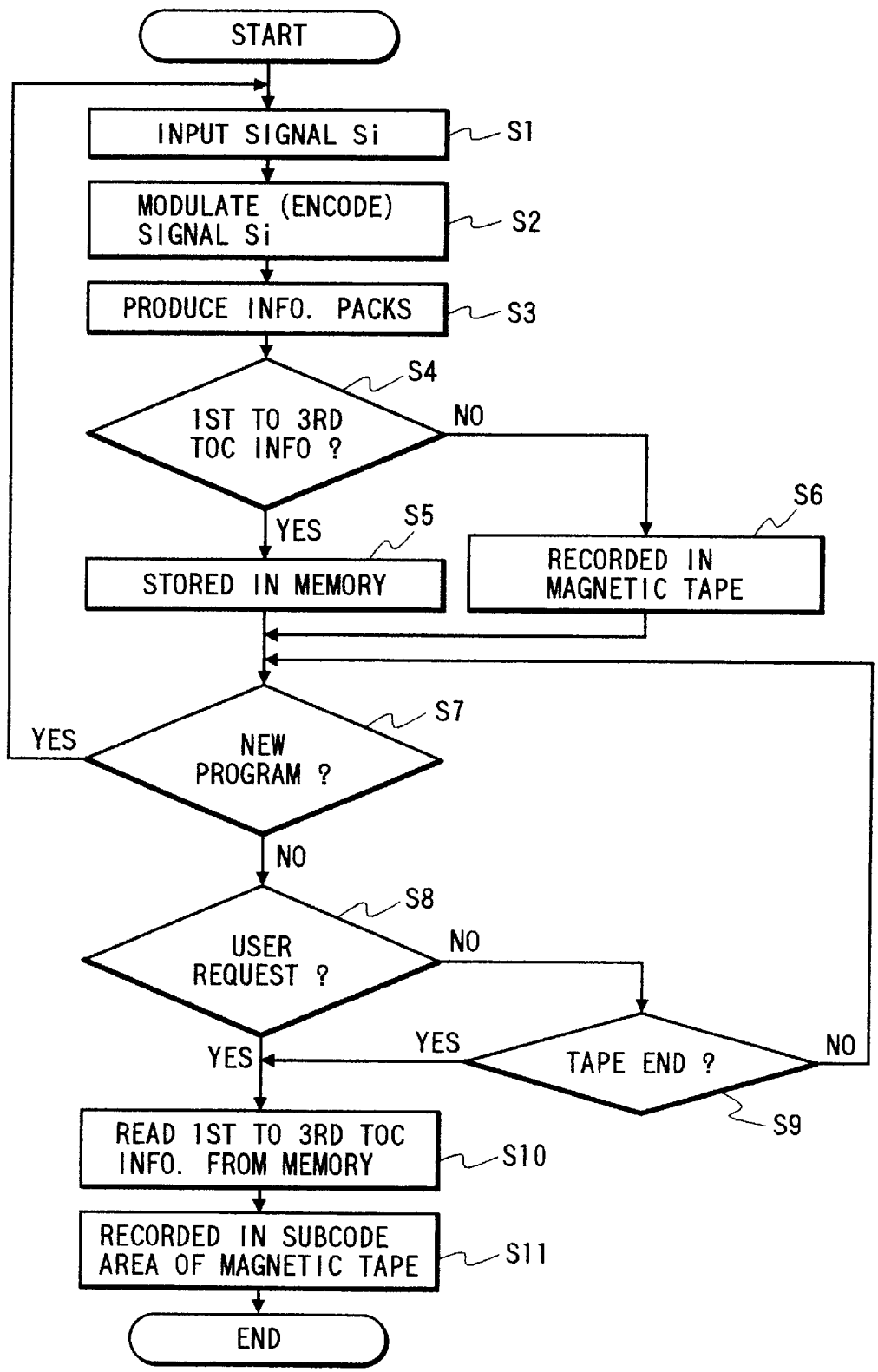
FIG. 7 is a flowchart showing an operation of the recording apparatus in accordance with the first embodiment of the present invention.

With reference to a flowchart shown in FIG. 7, an operation of the recording apparatus of the first embodiment will be explained. The input signal Si, such as a video signal of a program, is entered into the encoder 1 (step S1). The input signal Si is modulated sequentially into time series data blocks as main data (step S2). The above-described various packs shown in FIGS. 2A to 2K are produced by the encoder 1 (step S3). The controller 100 checks the pack information Pai received from the encoder 1 (step S4). The packs related to the above-described first to third TOC information are temporarily stored in the memory 2 in connection with the cassette ID information of the magnetic tape 3 (step S5). The main data and other necessary packs are recorded immediately on the magnetic tape 3 (step S6). The rotary head assembly 4 successively form the tracks on the magnetic tape 3 for recording the main data and the other necessary packs.

The auxiliary information, not memorized in the memory 2 and directly recorded on the magnetic tape 3 together with the main data, are for example the track number and the absolute time code. The track number represents an absolute address on the magnetic tape 3. Both the track number and the absolute time code are recorded in the subcode area 13.

The controller 100 monitors the program start signal Sps. The above-described operation (steps S1–S6) is repeated every time a new program is recorded (step S7). Even if the magnetic tape 3 is unloaded from the VTR, the auxiliary information relating to the TOC information of the unloaded magnetic tape 3 are stored in the memory 2 in connection with each cassette ID information. Accordingly, the memory 2 stores auxiliary information relating to TOC information for each recorded program in connection with each cassette ID information.

The controller 100 monitors the user request signal Su and the tape end signal Ste (steps S8 and S9). When either of these signals Su and Ste is entered into the controller 100, the controller 100 causes the memory 2 to output the stored data to the encoder 1. The auxiliary information stored in the memory 2 are read at a time (simultaneously) when the magnetic tape 3 is fully recorded or in accordance with a user's request. The encoder 1 reads out the auxiliary information relating to the above-described first to third TOC information (step S10). The readout auxiliary information (i.e., first to third TOC information) are modulated into the previously-described packs and successively recorded to the subcode areas 13 of the magnetic tape 3 (step S11).

As explained previously, the playback rotary head is located at the position preceding these recording rotary heads. When the recording rotary heads record the auxiliary information relating to the above-described first to third TOC information on the magnetic tape 3, the playback rotary head reproduces the above-described track number and the absolute time code from the already recorded track. The track number and the absolute time code are recorded together with the main data on the recorded track. Referring to the reproduced track number or absolute time code values, the packs of the above-described auxiliary information relating to the first to third TOC information are written to the corresponding subcode area of the recorded tracks.

Accordingly, the recording operation of the auxiliary information relating to the above-described first to third TOC information is performed without losing the already-recorded main data of each program and the related auxiliary information in the main data area 17 in FIG. 4.

As described above, according to the first embodiment of the present invention, the designated auxiliary information are temporarily stored in the memory 2 in connection with the cassette ID information. After finishing recording of all programs, or at an arbitrary time, the stored auxiliary information are recorded at a time as the above-described first to third TOC packs on the magnetic tape 3. The capacity of the memory 2 can be reduced compared with the capacity required for the conventional tape navigation system. The auxiliary information, once recorded on the magnetic tape 3, can be compatibly available on a different VIR. Furthermore, there is no necessity of thoroughly reading the magnetic tape to create the TOC information to be recorded.

It is preferable, when the memory 2 is saturated, a warning message is displayed as a train of characters or produced as message voice to notify the user of the situation. In response to this warning, the user selects part of the auxiliary information to transfer the selected auxiliary information to the magnetic tape. That is, the auxiliary information stored in the memory 2 are partly erased. Thus, the capacity of the memory 2 becomes available for storing new auxiliary information.

Second Embodiment

FIG. 8 is a block diagram showing an essential part of a recording and reproducing apparatus in accordance with a second embodiment of the present invention. The same components as those disclosed in FIG. 1 are denoted by identical numerals. In FIG. 8, the auxiliary information relating to the above-described first to third TOC information are stored in the memory 2. The encoder 1 modulates these auxiliary information into packs formatted as shown in FIGS. 2A through 2K. A recording rotary head 4a records the auxiliary information to the subcode region of the magnetic tape 3.

The digital signals recorded on the magnetic tape 3 are reproduced by a playback rotary head 4b, and demodulated into the main data and the auxiliary information by a decoder 31. Then, the auxiliary information are supplied through a digital interface circuit 32 to an external apparatus 33 such as a personal computer. The user arbitrarily edits the reproduced auxiliary information (for example, corrects or modifies the title) by manipulating the external apparatus 33. The edited auxiliary information are returned to the digital interface circuit 32 and stored in the memory 2. The controller 100 causes the encoder 1 to read the edited auxiliary information stored in the memory 2. The readout edited auxiliary information are modulated into the previously-described packs shown in FIGS. 2A–2K, and are successively recorded in the subcode areas 13 of the magnetic tape 3 by the recording rotary head 4a. According to this embodiment, any auxiliary information are arbitrarily modified or edited by the user.

It is preferable, when the memory 2 is saturated, a warning message is displayed as a train of characters or produced as message voice to notify the user of the situation. In response to this warning, the user selects part of the auxiliary information to transfer the selected auxiliary information to the magnetic tape. That is, the auxiliary information stored in the memory 2 are partly erased. Thus, the capacity of the memory 2 becomes available for storing new auxiliary information.

The rest of the structural feature and operation of the second embodiment is the same as those of the first embodiment described above.

Third Embodiment

Figure 10:
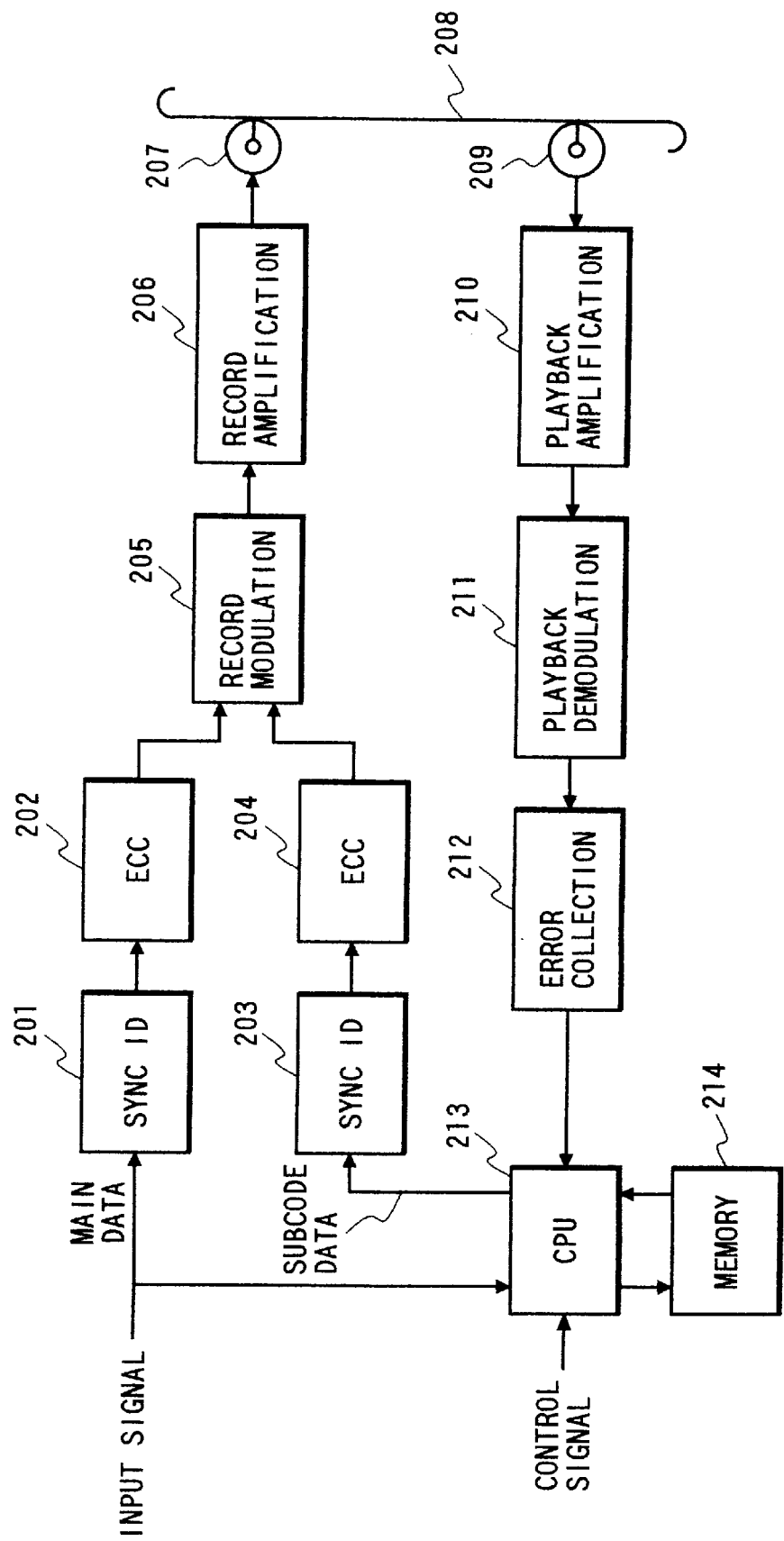
FIG. 10 is a block diagram showing an arrangement of a recording apparatus in accordance with a third embodiment of the present invention.

FIG. 10 is a block diagram showing a schematic arrangement of a recording apparatus in accordance with a third embodiment of the present invention. An input signal, such as a video signal or an audio signal of a TV program, comprises main data and auxiliary data. A sync ID section 201 receives the main data and puts a sync ID code on the main data. Subsequently, an ECC section 202 puts an error correcting code on the main data. Another sync ID section 203 receives the auxiliary data via a CPU 213 and puts a sync ID code on the auxiliary data. Subsequently, an ECC section 204 puts an error correcting code on the auxiliary data. A record modulation section 205 receives both the main data and the auxiliary data which are encoded in the above-described manner. The record modulation section 205 modulates the received main data and auxiliary data into a predetermined form. A record amplification section 206 amplifies the output of the record modulation section 205. A record head 207 records the amplified modulation data on a recording medium 208.

The data recorded on the recoding medium 208 can be reproduced by a playback head 209. The reproduced data are sent through a playback amplification section 210 to a playback demodulation section 211. An error correction section 212 performs a predetermined error correcting operation. Then, the reproduced data are sent to the CPU 213. The CPU 213 is associated with a memory 214 to store designated data into the memory 214 in response to a control signal. The CPU 213 receives various control signals for effecting assigned functions for the recording apparatus of this embodiment.

An operation of the CPU 213 will be explained hereinafter with reference to the flowcharts shown in FIGS. 11A, 11B and 11C.

Figure 11A:
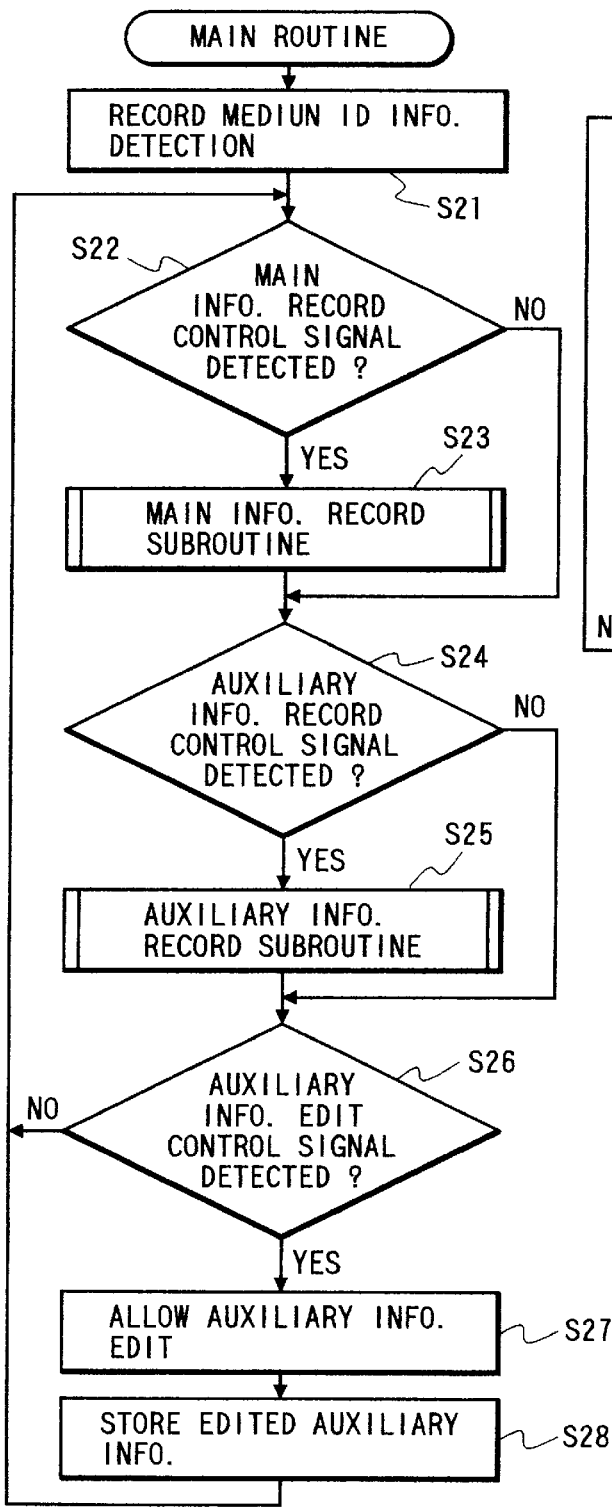
FIGS. 11A through 11C are flowcharts showing operations of the recording apparatus in accordance with the third embodiment of the present invention.

FIG. 11A is a flowchart showing a main routine of the control performed by the CPU 213. A first step S21 detects the recording medium ID information. A second step S22 makes a judgement as to whether or not a main information record control signal is detected. When the main information record control signal is detected (i.e., YES in step S22), step S23 performs a main information record subroutine, details of which will be described later. After finishing the step S23 or when the judgement result of step S22 is NO, the control flow proceeds to a step S24. Step S24 makes a judgement as to whether or not an auxiliary information record control signal is detected. When the auxiliary information record control signal is detected (i.e., YES in step S24), step S25 performs an auxiliary information record subroutine, details of which will be described later. After finishing the step S25 or when the judgement result of step S24 is NO, the control flow proceeds to a step S26. Step S26 makes a judgement as to whether or not an auxiliary information edit control signal is detected. When the auxiliary information edit control signal is detected (i.e., YES in step S26), the CPU 27 allows the auxiliary information to be edited by an operator through an appropriate editing apparatus, such as the digital interface circuit 32 and the external apparatus 33 shown in FIG. 8. Then, in step S28, the CPU 213 causes the memory 214 to store the edited auxiliary information. In this embodiment, the auxiliary information stored in the memory 214 includes the above-described first to third TOC information explained in the first embodiment.

Figure 11B:
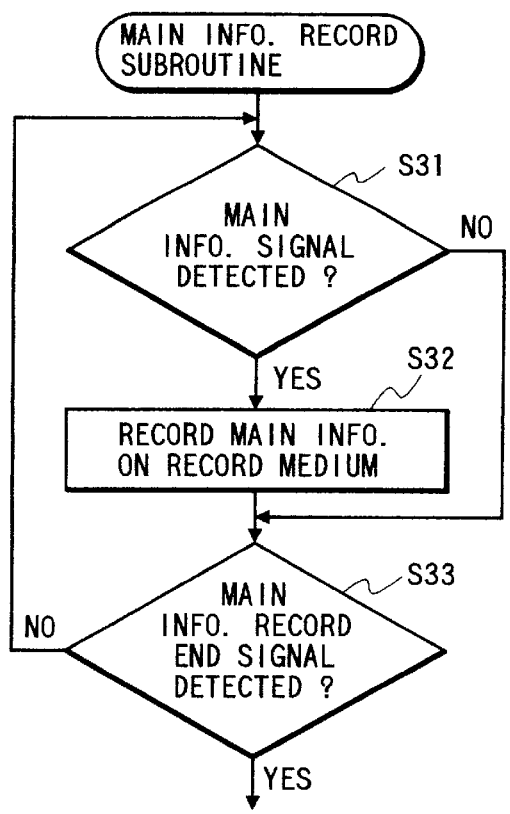

FIG. 11B is a flowchart showing the details of the main information record subroutine. Step S31 makes a judgement as to whether or not a main information signal is detected. When the main information signal is detected (i.e., YES in step S31), step S32 is performed to directly record the main information on the recording medium 208. After finishing the step S32 or when the judgement result of step S31 is NO, the control flow proceeds to a step S33. Step S33 makes a judgement as to whether or not a main information record end signal is detected. When the main information record end signal is detected (i.e., YES in step S33), the control flow returns to step S24 of the main routine. Otherwise (i.e., NO in step S33), the procedure of steps S31 to S33 is repetitively performed.

Figure 11C:
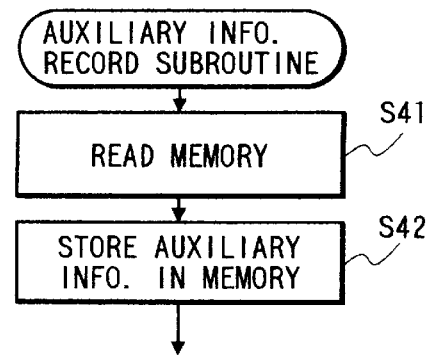

FIG. 11C is a flowchart showing the details of the auxiliary information record subroutine. Step S41 reads the memory 214. Then, step S42 stores the auxiliary information in the memory 214.

The auxiliary information stored in the memory 214 is read out in connection with the recording medium ID information at a time or simultaneously in response to the tape end signal or a user's request in the same manner as in the first embodiment. The readout auxiliary information are recorded on a predetermined region (e.g., subcode region) of the recording medium. In other words, all of data belong to the designated recording medium are transferred from the memory 214 to the recording medium 208. Thus, the auxiliary information relating to this recording medium is entirely erased from the memory 214.

The present invention is not limited to the above-described embodiments. For example, the recording medium can be a disk instead of the magnetic tape.

As explained in the foregoing description, according to the present invention, the designated auxiliary information are read later at a time or simultaneously from the memory means after the recording of all programs to the recording medium is finished or at an arbitrary time. The readout auxiliary information are recorded in the recording medium. Thus, according to the present invention, the memorization or storage of the auxiliary information in the memory means is temporary. The capacity of the memory means can be reduced compared with the capacity required for the conventional tape navigation system. As the auxiliary information of the memory means are recorded in the recording medium, the auxiliary information can be compatibly available on a different playback apparatus.

Furthermore, according to the present invention, there is no necessity of recording the auxiliary information for each program every time the main data of the program are recorded in the recording medium. Furthermore, there is no necessity of thoroughly reading the recording medium to create the auxiliary information to be recorded.

Yet further, according to the present invention, the reproduced auxiliary information can be supplied to an appropriate external apparatus for allowing the user to edit the auxiliary information arbitrarily. The edited auxiliary information are again stored in the memory means. Then, the edited auxiliary information stored in the memory means are recorded in the recording medium. Thus, the desired auxiliary information can be arbitrarily changed or modified.

This invention may be embodied in several forms without departing from the spirit of essential characteristics thereof. The present embodiments as described are therefore intended to be only illustrative and not restrictive. Since the scope of the invention is defined by the appended claims rather than by the description preceding them, all changes that fall within the metes and bounds of the claims, or equivalents of such metes and bounds, are therefore intended to be embraced by the claims.

What is claimed is:

1. A digital signal recording method for recording main data of a program into a recording medium as main information in the form of data blocks, and for recording auxiliary information of the program into the recording medium as packs having a fixed length shorter than a length of said data block, said digital signal recording method comprising the steps of recording said main data of the program into a main data area of said recording medium;

recording said packs of auxiliary information of said program into a subcode area and said main data area of said recording medium with each pack of auxiliary information having a specific pattern used to distinguish each pack from one another, temporarily memorizing designated packs of auxiliary information of said program into a memory means in response to the recording of said main data of the program, said designated packs of auxiliary information of said program being stored in said memory means in association with identification information of said recording medium; repeating the recording of said main data of the program and said packs of auxiliary information of said program into said recording medium and the memorization of designated packs of auxiliary information of said program into said memory means; simultaneously reading all of said packs of the auxiliary information relating to the same recording medium from said memory means; and recording the readout packs of auxiliary information in the form of said packs into a specific region of the recording medium having said identification information.

2. A digital signal recording method for recording main data of a program into a recording medium as main information in the form of data blocks, and for recording auxiliary information of the program into the recording medium as packs having a fixed length shorter than a length of said data block, said digital signal recording method comprising the steps of:

recording said main data of the program into a main data area of said recording medium;

recording said packs of auxiliary information of said program into a subcode area and main data area of said recording medium with each pack of auxiliary information having a specific pattern used to distinguish each pack from one another;

temporarily memorizing designated packs of auxiliary information of said program into a memory means in response to the recording of said main data of the program, said designated packs of auxiliary information of said program being stored in said memory means in association with identification information of said recording medium;

repeating the recording of said main data of the program and said packs of auxiliary information of the program into said recording medium and the memorization of designated packs of auxiliary information of said program into said memory means;

allowing an external apparatus to read and edit said packs of auxiliary information having the same identification information of said recording medium from said memory means;

memorizing the edited packs of auxiliary information into said memory means;

simultaneously reading all of the edited packs of auxiliary information from said memory means; and recording the readout edited packs of auxiliary information in the form of said packs into a specific region of the recording medium having said identification information.

3. The digital signal recording method in accordance with claim 1, wherein said packs of auxiliary information recorded in said recording medium comprises first packs of auxiliary information recorded in a recording region of a concerned program, second packs of auxiliary information recorded in a recording region of a preceding program, and third packs of auxiliary information recorded in a recording region preceding a first recorded program, wherein said first packs of auxiliary information includes recording start positions of any preceding recorded programs, said second packs of auxiliary information includes a recording start point of said concerned program; and said third packs of auxiliary information includes all of recording start positions of all recorded programs of said recording medium.

4. A recording apparatus comprising:

signal generating means for receiving an input signal and for producing main data of a program as main information in the form of data blocks and related auxiliary information of the program in the form of packs having a fixed length shorter than a length of said data block;

recording means for receiving said main data and said packs of related auxiliary information from said signal generating means and for recording said main data into a main data area of a recording medium and for recording said packs of related auxiliary information into a subcode area and said main data area of said recording medium;

memory means for temporarily memorizing designated packs of auxiliary information of said program in response to the recording or said main data of the program, said designated packs of auxiliary information of said program being stored in said memory means in association with identification information of said recording medium means for simultaneously reading all of the packs of auxiliary information relating to the same recording medium from said memory means with reference to said identification number, and sending the readout packs of auxiliary information to said recording means; and said recording means receiving said all of the packs of auxiliary information read out from said memory means and recording said readout packs of auxiliary information into a specific region of said recording medium in association with the main data of said program.

5. A recording apparatus comprising:

signal generating means for receiving an input signal and for producing main data of a program as main information in the form of data blocks and related auxiliary information of the program in the form of packs having a fixed length shorter than a length of said data block;

recording means for receiving said main data and said related auxiliary information from said signal generating means and for recording said main data into a main data area of a recording medium and said packs of related auxiliary information into a subcode area and said main data area of said recording medium, each pack having a specific pattern used to distinguish each pack from one another;

playback means for reproducing said main data and said packs of related auxiliary information recorded in said recording medium;

memory means for temporarily memorizing designated packs of auxiliary information of said program in response to the recording of said main data of the program, said designated packs of auxiliary information of said program being stored in said memory means in association with identification information of said recording medium;

means for simultaneously reading all of the packs of auxiliary information relating to the same recording medium from said memory means with reference to said identification number, and sending the readout packs of auxiliary information to said recording means;

external apparatus for receiving said packs of auxiliary information reproduced from said playback means and editing said packs of auxiliary information in a desired manner, said edited packs of auxiliary information being memorized in said memory means, and said recording means receiving said edited packs of auxiliary information read out from said memory means and recording said edited packs of auxiliary information into a specific region of said recording medium in association with the main data of said program.

6. The recording apparatus in accordance with claim 4, wherein said auxiliary information in the form of said packs recorded in said recording medium comprises first packs of auxiliary information recorded in a recording region of a concerned program, second packs of auxiliary information recorded in a recording region of a preceding program and third packs of auxiliary information recorded in a recording region preceding a first recorded program, wherein said first packs of auxiliary information includes recording start positions of any preceding recorded programs, said second packs of auxiliary information includes a recording start point of said concerned program; and said third packs of auxiliary information includes all of recording start positions of all recorded programs of said recording medium.

* * * * *